United States Patent Office 3,407,617
Patented Oct. 29, 1968

3,407,617
METHOD OF REMOVING DISSOLVED WAX FROM A REFRIGERANT
William F. Wischmeyer, Ladue, and John E. Hoffman, Webster Groves, Mo., assignors to Sporlan Valve Company, St. Louis, Mo., a corporation of Missouri
No Drawing. Continuation of application Ser. No. 397,626, Sept. 18, 1964. This application Dec. 5, 1966, Ser. No. 599,325
8 Claims. (Cl. 62—85)

ABSTRACT OF THE DISCLOSURE

This invention relates generally to an adsorbent for removing dissolved wax and acid from fluids, and more particularly to the use of an adsorbent in a filter for filtering and removing contaminants including dissolved wax and acid from refrigerants in refrigeration or air conditioning systems. The adsorbent consists of a porous core composed of activated charcoal for removing dissolved wax from the refrigerant and zeolite for removing water and acid from the refrigerant.

---

This is a continuation of Ser. No. 397,626, filed Sept. 18, 1964, now abandoned. Difficulty has been experienced frequently in low temperature refrigeration systems because of small amounts of wax dissolved in the refrigerant which precipitate at the expansion valve to cause a valve malfunction and/or in the evaporator to cause partial or complete failure of the system. This problem has been brought to the attention of ASHRAE and is reported in The Air Conditioning, Heating and Refrigeration News dated Feb. 16, 1964, p. 20, and also in their issue of Mar. 16, 1964, p. 10. It is recognized as an industry problem. The systems involved are usually frozen food cabinets, ice cream cabinets and similar refrigeration applications operating below zero degrees F. evaporator temperature. The exact source of the wax has not been exactly determined. It has been shown that this wax can come from residual drawing oil and other compounds left in refrigeration equipment during processing, and also from paste-type soldering flux. Further, some of the wax could enter the system during field installation because of the methods and equipment normally used.

The wax is dissolved in the refrigerant liquid and passes through conventional filters and/or filter-driers used in the liquid line. When the refrigerant liquid such as monochlorodifluoromethane and Refrigerant 502 is partially evaporated and cooled to evaporator temperature at the expansion valve, this wax precipitates and causes clogging or sticking of the valve. The result is erratic operation of the expansion valve which causes partial or complete failure of the system. Repeated cleaning of the expansion valve may be necessary to get the system operating efficiently.

It is believed that the wax content of the refrigerant must be in the range of 200 p.p.m. (parts per million) or less to preclude precipitation of wax at low temperatures encountered in refrigeration systems.

Moreover, it has been found that the introduction of moisture in conventional refrigeration systems tends to cause the water to react chemically with the refrigerant to form acids which, in turn, corrode the internal parts of the system and break down the oil. Under the influence of small amounts of air, excessive heat, or other factors the oil also can break down chemically to form acids, resinous materials and sludges. By these means both inorganic and organic acids are formed in refrigeration systems. Once the oil undergoes decomposition, sludge is introduced into the system and motor burn-outs result. Therefore, it is necessary to remove as much acid as is possible from the refrigerant.

It is an important object of the present invention to use activated charcoal, sometimes referred to as activated carbon as an adsorbent in a filter through which fluid such as refrigerant passes, the activated charcoal removing dissolved wax and acid from the fluid.

It has been found that activated charcoal is particularly good for adsorbing a substance having large molecules from a fluid such as a solvent or refrigerant consisting of relatively small molecules. The pore size and other characteristics of activated charcoal are exactly suitable for adsorbing large wax molecules from refrigerants.

Adsorbents such as silicia gel, crystalline zeolite molecular sieve, activated alumina, calcium sulphate, fuller's earth, and activated bauxite do not remove dissolved wax from refrigerants. However, activated charcoal removes dissolved wax from fluids such as refrigerants within a range of 1.6–2.4% of its weight while maintaining 200 p.p.m. of wax in the refrigerant or within the range of 4.0–6.0% of its weight while maintaining 1500 p.p.m. of wax in the refrigerant. As indicated above by the range of percentage, the wax removal ability of different types of charcoal does vary.

Practically all of the refrigerants except ammonia are made up of hydrocarbons containing chlorine or fluorine atoms which are halogen compounds. Therefore, the most general name for refrigerants is "halocarbon refrigerants." The activated charcoal can be used to remove dissolved wax and acid from all of the halocarbon refrigerants such as the following, the usual refrigerant designation number being given in parenthesis: dichlorodifluoromethane (12), monochlorodifluoromethane (22), trichloromonofluoromethane (11), trichlorotrifluoromethane (113), dichlorotetrafluoromethane (114), methylchloride (40), Refrigerant 500 which is an azeotrope of dichlorodifluoromethane and difluoromethane, Refrigerant 502 which is an azeotrope of monochlorodifluoromethane and monochloropentafluoroethane, and others. The wax problem which the present process solves occurs only with monochlorodifluoromethane and Refrigerant 502.

A refrigeration system uses refrigeration oil to lubricate moving parts in the compressor. Part of the oil circulates with the refrigerant. Refrigerant oil is composed of relatively large molecules compared to the refrigerant molecules, and it would logically be anticipated that because activated charcoal removes the large wax, oil break-down products, and acid molecules, that it would also remove the large oil molecules. However, it has been found that the activated charcoal does not remove the relatively large oil molecules from the refrigerant. This is an unobvious and unexpected advantageous result. Of course, it is necessary to have refrigerant oil in the system. Moreover, it has been found that the presence of oil in the system has no effect on the capability of the activated charcoal to remove dissolved wax, resins and acids from the refrigerant.

When common desiccants such as silica gel, activated alumina, molecular sieve, activated bauxite and fuller's earth are used to remove oleic acid from refrigerant, such desiccants have a capacity to remove acid within the range of 1.0–4.2% of their weight while maintaining 200 p.p.m. and an approximate capacity of 6.5% of their weight at 2,000 p.p.m. However, activated charcoal has an acid capacity within the range of 3.2–10.0% of its weight at 200 p.p.m. and a capacity of over 20% of its weight at 2,000 p.p.m. From these figures it will be understood that activated charcoal has an acid capacity of from two to three times that of any other desiccant. As indicated by the percentage range given above the acid removal ability of various types of activated charcoal does vary.

It is well known and conventional to use a filter-drier to remove contaminants such as foreign matter, acid and moisture from the refrigerant. This feature is fully explained in U.S. Patent No. 3,025,233 in which a specific core composition is disclosed, namely, crystalline zeolite molecular sieve and activated alumina bonded together by an inert water-insoluble binder. These adsorbents disclosed in U.S. Patent No. 3,025,233 will not remove wax dissolved in the refrigerant, but will remove the other identified contaminants to a certain extent.

Therefore, activated charcoal can be utilized in conjunction with any other adsorbent in a refrigeration filter-drier to afford a unit that, when applied in the liquid line of the system, will remove the dissolved wax before it can precipitate at the expansion valve, will remove many times the amount of acid than that removed previously by any other filter-drier, and remove the moisture and other contaminants.

The addition of activated charcoal to a refrigerant filter and/or filter-drier represents an economical and practical method of application because these units are normally used in refrigeration systems. The activated charcoal is a valuable contribution to the refrigerant filter-drier for removing contaminants and prolonging the life of a refrigeration system.

Although filters and/or filter-driers utilizing activated charcoal will be usually applied in the liquid line of refrigerant systems, they can be applied also in the suction line to meet specific objectives or meet the needs of particular types of refrigerant applications.

The activated charcoal can be used in loose granular form in a filter through which the refrigerant will flow, the activated charcoal adsorbing the dissolved wax and acid from the refrigerant. The loose granules of activated charcoal can be held under spring pressure in a filter unit to prevent attrition. Moreover, the activated charcoal can be molded into an integral, shaped porous core with an inert water-insoluble binder. This core operates effectively and efficiently in removing dissolved wax and acids from the refrigerant and attains all of the other functional advantages previously described.

It is possible to mold a core of any adsorbent or combination of adsorbents in which a recess or hole is formed into which activated charcoal can be placed and sealed, the activated charcoal being in either molded or loose granular form. Also, the activated charcoal in either a molded or loose granular form can be located and retained about another adsorbent core.

The bonding material utilized to form cores of 100% activated charcoal or cores of activated charcoal combined with at least one other adsorbent, must have high bonding strength, be inert (i.e. does not react with the fluid being filtered and does not destroy the filtering or adsorbent properties of the constituents of the core), be water-insoluble, permit fluid to flow between the particles in the core, enable the desiccant particles to retain their adsorption capacity, and permit the core to filter fluids under full flow with a negligible pressure drop. Inorganic binders such as aluminum phosphate binders of the type disclosed in U.S. Patent No. 2,405,884 or sodium silicate binders or others may be used. Organic binders such as phenol-formaldehyde, epoxide resins, and other similar resins may also be used.

All other adsorbents such as silica gel, crystalline zeolite molecular sieve, activated alumina, calcium sulphate, fuller's earth and activated bauxite do not remove dissolved wax from refrigerant, but do remove moisture. Any one or combination of these or any other adsorbents can be used in conjunction with activated charcoal in loose or molded form in a filter-drier to dry the refrigerant and also to remove dissolved wax and acid.

The activated charcoal can be combined in a loose or molded form with any or all other adsorbents. Any composition of activated charcoal and other adsorbent will be satisfactory. There is no lower or upper limit of the percentage of activated charcoal. The percentages of activated charcoal and other adsorbents can be varied to any value from more than zero percent to any value less than 100% in order to obtain a certain performance of the core with respect to water, acid and dissolved wax removal. In other words, the percentages can be varied over the entire range in order to obtain differences in the relative amount of water, acid and dissolved wax removal.

In an integral molded core of activated charcoal and other adsorbents, the strength of such core may vary as the percentage of activated charcoal and other adsorbents is varied, which, in turn, may require varying the percentage of bond in order to get a core of any given strength. However, the strength of the core is immaterial in connection with the invention because the strength or the amount of bond has no effect or bearing on the function or degree of water, acid and dissolved wax removal.

A molded core can be provided by mixing activated charcoal with any other adsorbent together with an inert water-insoluble binder of the type described previously. The mixture is then pressed into the desired shape and cured under the proper conditions to set the binder and to form a hard integral porous core. During or after the curing step, any adsorbed water and/or water of hydration of the components is removed.

The following are other examples exemplifying various compositions incorporating activated charcoal having the multiple capability of removing dissolved wax, acid and water from refrigerants. It will be understood that these compositions can be used to provide a unitary molded core by binding the adsorbents including the activated charcoal with an inert water-insoluble binder, or can be combined in a loose granular form to provide a loose fill in a filter, or can be provided by using the activated charcoal in loose granular form in combination and association with a molded core as by placing the granular activated charcoal in a cavity formed in the core formed by another adsorbent.

A particularly advantageous composition is attained for drying refrigerants and for removing dissolved wax and acid from such refrigerants by activated charcoal and crystalline zeolite molecular sieve. A molded porous core will comprise activated charcoal, crystalline zeolite molecular sieve and an inert water-insoluble binder. A specific example is a composition having about 50% by weight activated charcoal and the remainder of the adsorbent being crystalline zeolite molecular sieve.

Another specific example is a core consisting of about 20% by weight activated charcoal and the remainder comprising other adsorbent material bonded together by an inert water-insoluble binder. While any other adsorbent material can be used in this example, including those specifically mentioned previously, it is advantageous to use crystalline zeolite molecular sieve because of its relatively high moisture capacity. A more specific example would be a core comprising about 20% by weight activated charcoal, about 49% by weight alumina, about 6% by weight crystalline zeolite molecular sieve and about 25% by weight bond.

Another example is a core formed by using activated charcoal with the adsorbents and in the examples disclosed in U.S. Patent No. 3,025,233, and specifically a core comprising activated charcoal with about 7%–31% by weight crystalline zeolite molecular sieve, about 39%–93% by weight activated alumina and an inert water-insoluble binder.

Another example is a core comprising about 5%–65% by weight crystalline zeolite molecular sieve and the remainder being activated charcoal and an inert water-insoluble binder.

Another example is a core the composition of which is about 25% by weight activated charcoal, about 45% by weight activated alumina, about 5% by weight crystalline zeolite molecular sieve (activated) and about 25% by weight bond such as aluminum phosphate.

The foregoing detailed description has been given for clearness of understanding only, and no unnecessary limitation should be understood therefrom, as modifications will be obvious to those skilled in the art.

We claim as our invention:

1. The process for removing dissolved wax, acid and moisture from monochlorodifluoromethane and Refrigerant 502 in low-temperature refrigeration systems comprising the steps of locating an adsorbent in the flow path of the refrigerant in the system, and passing the refrigerant through the adsorbent, the adsorbent is a porous core comprising activated charcoal, another adsorbent material, and an inert water-insoluble binder, the charcoal removing the dissolved wax and acid, and leaving refrigeration oil in the refrigerant, and the other adsorbent material removing acid and moisture.

2. The process for removing dissolved wax, acid and moisture from monochlorodifluoromethane and Refrigerant 502 in low-temperature refrigeration systems comprising the steps of locating an adsorbent in the flow path of the refrigerant in the system, and passing the refrigerant through the adsorbent, the adsorbent is a composition comprising activated charcoal and crystalline zeolite molecular sieve, the charcoal removing the dissolved wax and acid, and leaving refrigeration oil in the refrigerant, and the zeolite molecular sieve removing the acid and moisture.

3. The process for removing dissolved wax, acid and moisture from monochlorodifluoromethane and Refrigerant 502 in low-temperature refrigeration systems comprising the steps of locating an adsorbent in the flow path of the refrigerant in the system, and passing the refrigerant through the adsorbent, the adsorbent is a composition comprising about 50% by weight activated charcoal and the remainder consisting of substantially crystalline zeolite molecular sieve, the charcoal removing the dissolved wax and acid, and leaving refrigeration oil in the refrigerant, and the zeolite molecular sieve removing the acid and moisture.

4. The process for removing dissolved wax, acid and moisture from monochlorodifluoromethane and Refrigerant 502 in low-temperature refrigeration systems comprising the steps of locating an adsorbent in the flow path of the refrigerant in the system, and passing the refrigerant through the adsorbent, the adsorbent is a porous core comprising activated charcoal, crystalline zeolite molecular sieve, and an inert water-insoluble binder, the charcoal removing the dissolved wax and acid, and leaving refrigeration oil in the refrigerant, and the zeolite molecular sieve removing the acid and moisture.

5. The process for removing dissolved wax, acid and moisture from monochlorodifluoromethane and Refrigerant 502 in low-temperature refrigeration systems comprising the steps of locating an adsorbent in the flow path of the refrigerant in the system, and passing the refrigerant through the adsorbent, the adsorbent is a composition comprising about 10%–56% by weight activated charcoal, about 5%–31% by weight crystalline zeolite molecular sieve and about 39%–93% by weight activated alumina, the charcoal removing the dissolved wax and acid, and leaving refrigeration oil in the refrigerant, and the zeolite molecular sieve and alumina removing the acid and moisture.

6. The process for removing dissolved wax, acid and moisture from monochlorodifluoromethane and Refrigerant 502 in low-temperature refrigeration systems comprising the steps of locating an adsorbent in the flow path of the refrigerant in the system, and passing the refrigerant through the adsorbent, the adsorbent is a porous core comprising about 10%–56% by weight activated charcoal, about 5%–31% by weight crystalline zeolite molecular sieve about 39%–93% by weight activated alumina, and an inert water-insoluble binder, the charcoal removing the dissolved wax and acid, and leaving refrigeration oil in the refrigerant, and the zeolite molecular sieve and alumina removing the acid and moisture.

7. The process for removing dissolved wax, acid and moisture from monochlorodifluoromethane, and Refrigerant 502 in low-temperature refrigeration systems comprising the steps of locating an adsorbent in the flow path of the refrigerant in the system, and passing the refrigerant through the adsorbent, the adsorbent is a porous core comprising about 5%–65% by weight crystalline zeolite molecular sieve, and the remainder activated charcoal and an inert water-insoluble binder, the charcoal removing the dissolved wax and acid, and leaving refrigeration oil in the refrigerant, and the zeolite molecular sieve removing the acid and moisture.

8. The process for removing dissolved wax, acid and moisture from monochlorodifluoromethane and Refrigerant 502 in low-temperature refrigeration systems comprising the steps of locating an adsorbent in the flow path of the refrigerant in the system, and passing the refrigerant through the adsorbent, the adsorbent is a porous core comprising about 25% by weight activated charcoal, about 45% by weight activated alumina, about 5% by weight crystalline zeolite molecular sieve and about 25% by weight inert water-insoluble binder, the charcoal removing the dissolved wax and acid, and leaving refrigeration oil in the refrigerant, and the zeolite molecular sieve and alumina removing the acid and moisture.

References Cited

UNITED STATES PATENTS

| | | | |
|---|---|---|---|
| 1,855,659 | 4/1932 | Wright | 62—85 X |
| 2,341,429 | 2/1944 | Elsey | 62—85 X |
| 2,933,455 | 4/1960 | Doying | 252—428 |
| 3,091,550 | 5/1963 | Doying | 117—76 |
| 3,175,342 | 3/1965 | Balogh | 62—85 X |

ROBERT A. O'LEARY, *Primary Examiner.*

W. E. WAYNER, *Assistant Examiner.*